W. H. S. NELSON.
FINGER SUPPORT FOR STRINGED INSTRUMENTS.
APPLICATION FILED MAR. 4, 1910.
1,017,448.
Patented Feb. 13, 1912.
2 SHEETS—SHEET 1.
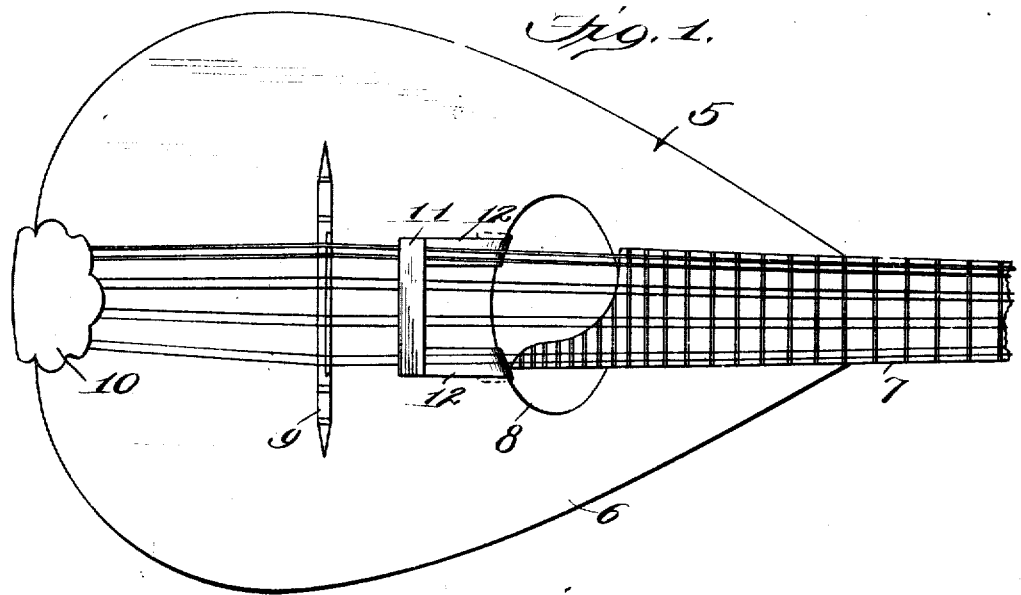
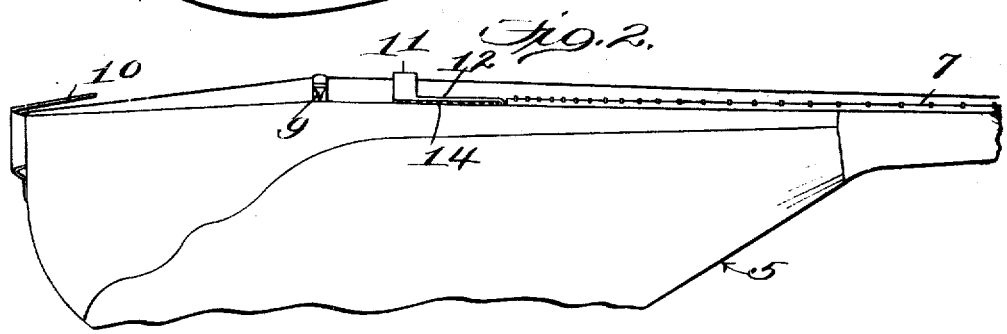
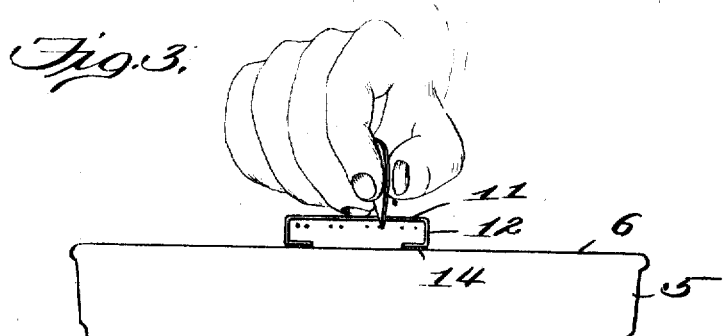

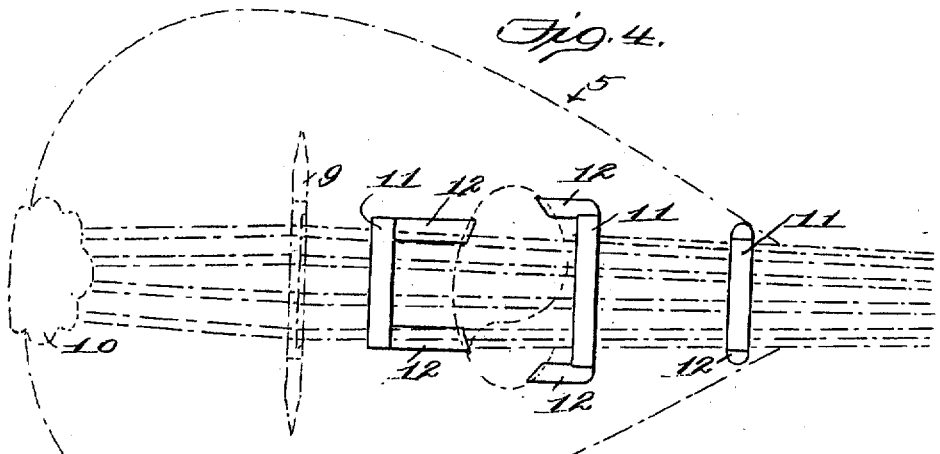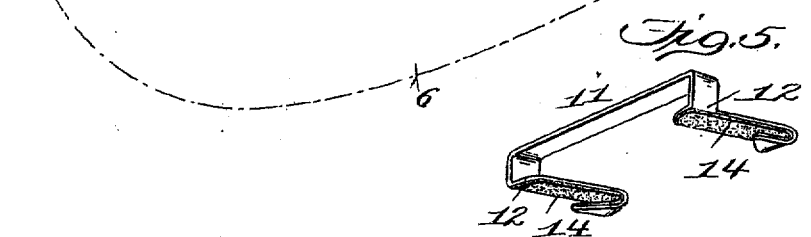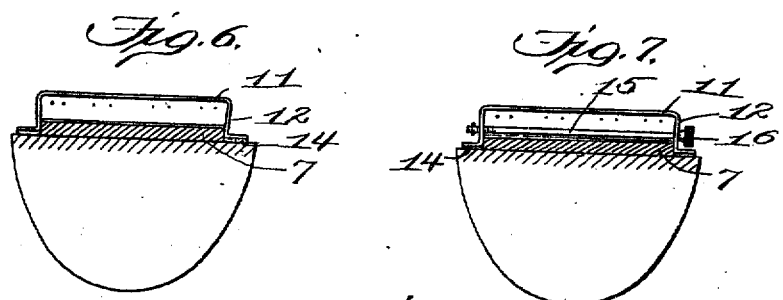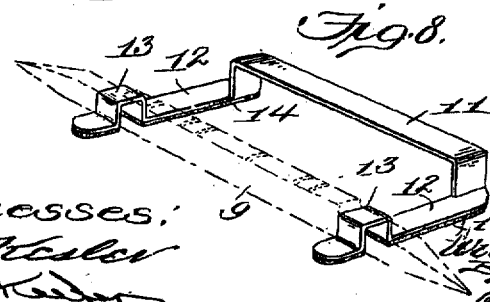

UNITED STATES PATENT OFFICE.

WILLIAM H. S. NELSON, OF CAPON SPRINGS, WEST VIRGINIA.

FINGER-SUPPORT FOR STRINGED INSTRUMENTS.

1,017,448.

Specification of Letters Patent. Patented Feb. 13, 1912.

Application filed March 4, 1910. Serial No. 547,318.

*To all whom it may concern:*

Be it known that I, WILLIAM H. S. NELSON, a citizen of the United States, residing at Capon Springs, in the county of Hampshire and State of West Virginia, have invented new and useful Improvements in Finger-Supports for Stringed Instruments, of which the following is a specification.

This invention relates to a guide attachment for mandolins or similar stringed instruments.

It has been customary for players of mandolins or similar stringed instruments while executing music, to position the right hand by resting the wrist on the tail-piece and sometimes one or more fingers on the top board of the instrument at such point as to permit the performer to pick, with a plectrum held between the thumb and forefinger, the strings of said instrument at any desired distance forward of the bridge. This mode of playing, though approved and taught, has many objectionable features, and especially for the beginner and amateur, and among these disadvantages may be mentioned the following: difficulty for any player except an expert to execute a smooth, regular tremolo on a note of even short duration on the G-string; difficulty for any player except an expert to execute a smooth, regular tremolo on a note of several bars duration on any string; fatigue and cramp due to unnatural curved position of the wrist and hand, which any player not an expert or in "good form" suffers when playing for any considerable length of time; and defacement of the instrument by the fingers resting on the top board and particularly by a beginner or one who has not mastered the proper hand positions and finger movements.

The primary object of the invention is to avoid the foregoing objectionable features in the present mode of playing a mandolin or similar stringed instrument, and to readily and naturally position the hand of the player so that while the springs can be picked with ease and facility the plectrum may at all times, unless otherwise desired, be brought into regular and equal contact with the strings of the instrument and at any point desired forward of the bridge.

The invention involves, for any ordinary mandolin or similar instrument, a hand guide adapted to be positioned as may be desired on the instrument to enable the player to apply all, or one or more, of the second, third, and fourth fingers of the right hand upon said guide with light pressure and movement so that the playing fingers, or the thumb and index finger of the hand, will be maintained at a uniform distance above all the springs in accordance with predetermination to properly pick or strike the strings of the instrument with a plectrum held between the said playing fingers. It is proposed to construct the guide in various forms and position it at different distances forward of the bridge so as to enable the performer to bring out various quantities and qualities of tone.

In the drawings: Figure 1 is a top plan view of a portion of a mandolin showing the improved guide attachment in one form applied thereto. Fig. 2 is a side elevation of a portion of a mandolin with the guide attachment applied thereto. Fig. 3 is a diagrammatic view showing the mode of using the attachment. Fig. 4 shows a portion of a mandolin in top plan view in dotted lines and a plurality of the attachments positioned thereon at different distances in advance of the bridge to obtain various quantities and qualities of tone. Fig. 5 is a detail perspective view of one form of the attachment. Fig. 6 is a transverse vertical section through a portion of the mandolin showing another form of the attachment applied over the fret-board, close to the juncture of the neck with the mandolin. Fig. 7 is a view similar to Fig. 6 showing a modification of the attachment as illustrated by the latter figure. Fig. 8 is a detail perspective view showing the attachment arranged for application to the bridge of the instrument.

The numeral 5 designates a mandolin which embodies the usual top board 6, finger board 7, sound hole 8, bridge 9, and tail-piece 10.

A mandolin is shown in the accompanying drawings to demonstrate the practical use of the attachment, but it will be understood that the attachment is adapted to be applied to any other stringed instrument which is played by a plectrum or similar device.

The attachment consists of a guide 11 having legs 12 which are applied either to the rear portion of the sound hole 8, the front portion of said sound hole, to different parts of the finger board 7, or to the bridge 9.

The form of the attachment illustrated by Figs. 1, 2 and 3 has the legs 12 terminally shaped to clamp over the rear portion of the sound hole 8 and the guide is positioned between the bridge 9 and said sound hole.

As shown by Fig. 4, the guide has its legs 12 shaped and proportioned to engage the front wall of the sound hole 8 to locate the said guide in advance of the sound hole.

As shown by Figs. 4, 6 and 7, the guide may be applied over the neck at any point on the latter, and as illustrated by Fig. 8 the legs 12 of the guide are bent as at 13 to fit over the bridge 9.

In all the forms of the attachment except that illustrated by Fig. 7, the resiliency of the legs 12 is relied upon to maintain the attachment in applied position, and, furthermore, it will be observed that the legs will be made long or short in accordance with the part of the instrument to which they are applied and the desirable position of the guide. It is proposed to construct the guide entirely of metal highly polished or plated, or the guide may be of wood with metal legs, or metal covered with wood, or any other suitable material.

To prevent abrasion of or injury to the top board 6 and other parts of the instrument engaged by the legs, the latter are padded or lined as at 14 with a suitable fabric or buffing material. In the modification shown by Fig. 7, the legs 12 are drawn against the opposite side edges of the finger board 7 by a clamping screw rod 15 extending through the legs 12 beneath the strings of the instrument and provided with a milled head 16 at one extremity. In the finger board engaging form of the guide as shown by Fig. 6, the legs 12 will have sufficient resiliency to spring over and tightly hold the attachment with relation to the opposite side edges of the finger board, and the ends of the legs bear upon the adjacent portions of the top board when the attachment is applied over the finger board extending toward the sound hole and in engagement with the top board.

The guide 11 or the main element of the attachment extends transversely across the strings and at such distance above the latter as to be reliable in performing its function.

One of more of the attachments may be used at the same time in different positions over the strings and in rear and in advance of the sound hole to enable a performer to bring out or obtain various quantities and qualities of tone.

As hereinbefore explained, the performer may rest all, or one or more, of the second, third, and fourth fingers of the right hand upon the guide with a light pressure so as to conveniently support the hand and fingers to facilitate action of the thumb and forefinger holding the plectrum and without tiring the performer and insuring a regular and positive engagement of the strings to effect a perfect tremolo and avoid a miss pick.

As shown by Fig. 3, the preferred position of the hand will be with the nail of the second finger resting lightly on the guide 11, and in this position the hand will be moved over the guide transversely with relation to the strings so as to maintain a uniform depression or engagement of the point of the plectrum with the strings.

From the foregoing it will be understood that the essential feature of the invention involves the use of a guide for the transverse movement of the hand of the performer relatively to the strings of the instrument and to secure a uniformity of depression of the plectrum relatively to the strings to effect a perfect tremolo of either long or short duration without tiring the performer.

By means of the guide, a performer, and particularly a beginner or one who is not an expert, will have his hand unconsciously trained in the correct position relatively to the strings without the tiresome and ofttimes painful conditions resulting from the ordinary methods adopted by instructors.

The attachment is also exceptionally advantageous in assisting in strengthening a weak hand or fingers, a condition often encountered and resulting in considerable discouragement to the beginner.

The attachment is also a valuable accessory for performers generally in playing a mandolin or analogous instrument for long periods of time as a means for easing the hand.

Changes in the proportions, dimensions and minor details may be adopted at will to accommodate various applications of the attachment.

What is claimed is:

1. The combination with a musical stringed instrument of the mandolin type having a sound opening, of a support extending transversely over all of the strings of the instrument and having a straight flat surface parallel with the strings with which one or more fingers of the hand holding the plectrum movably engage, the support having terminal attaching means detachably engaging a part of the body of the instrument, the strings of the instrument being exposed both in front and in rear of the support and the latter being out of contact with all of the strings.

2. The combination with a musical stringed instrument of the mandolin type, of a flat support extending transversely over and parallel to and out of contact with all of the strings and having terminal attaching means detachably engaging a portion of the body of the instrument and shiftable from one position to another on the instrument body.

3. The combination with a musical stringed instrument of the mandolin type and having a sound opening, of a flat support detachably held on the body of the instrument and extending over and parallel with all of the strings of the instrument and freely movable to different positions on the instrument body and serving to maintain one or more fingers of the hand holding the plectrum in proper position to produce tremolo effects.

4. The combination with a musical stringed instrument of the mandolin type, of a plurality of separated supports extending transversely over all of the strings and resting on the body of the instrument to be engaged by one or more fingers of the hand holding the plectrum during various movements in playing the strings, the said supports being parallel and out of contact with the strings and the one support being in advance of the other so that a different volume and quality of tones may be obtained by the performer changing the position of the hand from one support to another.

5. The combination with a musical stringed instrument of the mandolin type having a sound hole, of supports extending transversely over and out of contact with all of the strings, said supports being located at different places along the length of the strings for movable engagement by a portion of the fingers of the hand of the performer to produce uniformity of movement of the fingers and regularity of depression of the plectrum and to obtain variations in volume and quality of tones by changing the position of the hand from one support to another.

In testimony whereof I have hereunto set my hand in presence of two subscribing witnesses.

WILLIAM H. S. NELSON.

Witnesses:
 CHAS. F. NELSON,
 W. F. GORE.